United States Patent
Saric

(10) Patent No.: US 7,660,458 B1
(45) Date of Patent: Feb. 9, 2010

(54) THREE-DIMENSIONAL MODEL CONSTRUCTION USING UNSTRUCTURED PATTERN

(75) Inventor: Marin Saric, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 683 days.

(21) Appl. No.: 11/011,727

(22) Filed: Dec. 14, 2004

(51) Int. Cl.
*G06K 9/00* (2006.01)

(52) U.S. Cl. ...................................................... 382/154
(58) Field of Classification Search ................. 382/154; 345/419, 427; 356/12
See application file for complete search history.

(56) References Cited

U.S. PATENT DOCUMENTS

| | | | | |
|---|---|---|---|---|
| 5,867,591 A * | 2/1999 | Onda | ........................... | 382/154 |
| 5,987,163 A * | 11/1999 | Matsuda | ..................... | 382/154 |
| 6,167,151 A * | 12/2000 | Albeck et al. | ............... | 382/154 |
| 6,249,600 B1 * | 6/2001 | Reed et al. | ................... | 382/154 |
| 6,493,469 B1 * | 12/2002 | Taylor et al. | ................. | 382/284 |
| 6,608,923 B1 * | 8/2003 | Zhang et al. | ................. | 382/154 |
| 6,724,922 B1 * | 4/2004 | Vilsmeier | .................... | 382/128 |
| 7,418,126 B2 * | 8/2008 | Fujimoto et al. | ............ | 382/154 |

\* cited by examiner

*Primary Examiner*—Charles Kim
*Assistant Examiner*—Edward Park
(74) *Attorney, Agent, or Firm*—Fish & Richardson P.C.

(57) ABSTRACT

Systems and methods using an unstructured pattern for three-dimensional model construction, such as may be used for processing images of documents are disclosed. The method generally includes projecting an unstructured infrared pattern onto a target object, capturing a pair of stereoscopic images of the pattern projected onto the target object, such as with infrared cameras, performing signal processing on the pair of stereoscopic images to cross-correlate portions of the stereoscopic images in order to identify corresponding portions in the stereoscopic images, and constructing a three-dimensional model of the target object. The three-dimensional model can be utilized to rectify, e.g., de-warp, an image of the target object, e.g., a page or both facing pages of a bound document.

25 Claims, 3 Drawing Sheets

THREE-DIMENSIONAL MODEL CONSTRUCTION USING UNSTRUCTURED PATTERN

BACKGROUND OF THE INVENTION

1. Field of the Invention

The present invention relates generally to processing images of documents. More specifically, systems and methods using an unstructured pattern for three-dimensional model construction, such as may be used for processing images of documents are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the libraries, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and/or distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses.

Optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner. Such platen-less scanning systems also often employ light sources to better illuminate the pages being imaged.

However, traditional three-dimensional model construction typically requires the detection of features in the three-dimensional object being viewed. Such features may include the edges of the curved pages and/or the gutter between two facing pages, for example. These features can often be difficult to detect and/or discriminate from other features. Thus, it would be desirable to provide systems and methods for improved three dimensional model construction.

SUMMARY OF THE INVENTION

Systems and methods using an unstructured pattern for three-dimensional model construction, such as may be used for processing images of documents are disclosed. It should be appreciated that the present invention can be implemented in numerous ways, including as a process, an apparatus, a system, a device, a method, or a computer readable medium such as a computer readable storage medium or a computer network.

The method may generally include projecting an unstructured pattern onto a target object, capturing a pair of stereoscopic images of the unstructured pattern projected onto the target object performing signal processing on the pair of stereoscopic images to cross-correlate portions of the pair of stereoscopic images in order to identify corresponding portions in the pair of stereoscopic images, and constructing a three-dimensional model of the target object. The pattern may be projected using infrared or visible light. The three-dimensional model can be utilized to rectify, e.g., de-warp, an image of the target object, e.g., a page or both facing pages of a bound document. A first of the two stereoscopic images may be divided into generally non-overlapping regions where multiple regions form a line and each region is wider than it is high such that the signal processing is performed for each region of the first stereoscopic image.

The pattern may include at least one feature in each region, the feature being locally unique along at least a portion of the line on which the region is located. As an example, the pattern may include at least one feature in each region, at least a portion of the feature extending along the height of the region.

The signal processing may further include comparing each region in the first stereoscopic image to areas at a plurality of positions along a corresponding line in a second of the two stereoscopic images, each area being of generally a same size as each region, each comparison generates a similarity score between the region in the first stereoscopic image and the area in the second stereoscopic image, and designating the area in the second stereoscopic image with the highest similarity score as the area that matches the region in the first stereoscopic image, and constructing the three-dimensional model of a target object based on the image data of the pairs of matching region and area. The comparing can be limited to be performed on areas in the second stereoscopic image that are within a predetermined distance from an area corresponding to the region being compared in the first stereoscopic image.

A system for constructing a three-dimensional model of an object may generally include a projector such as an infrared projector configured to project a pattern onto a target object, a pair of stereoscopic cameras configured to capture stereoscopic images of the pattern projected onto the target object, and a signal processor configured to perform signal processing on the pair of stereoscopic images to cross-correlate portions of the pair of stereoscopic images in order to identify corresponding portions in the pair of stereoscopic images and to construct the three-dimensional model of the target object.

The system may also include a camera to capture images of the target object such that the signal processor may utilize the three-dimensional model of the target object to rectify, e.g., de-warp, the image of the target object.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods using an unstructured pattern for three-dimensional model construction, such as may be used for processing images of documents are disclosed. The systems and methods as described in the examples presented herein are well suited for imaging bound documents in which the pages are generally curved when laid open in the absence of flattening pressure. However, the systems and methods can similarly be adapted or utilized for unbound documents including large, fragile, and/or rare unbound documents as well as for various other purposes in which construction of a three-dimensional model is desired. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
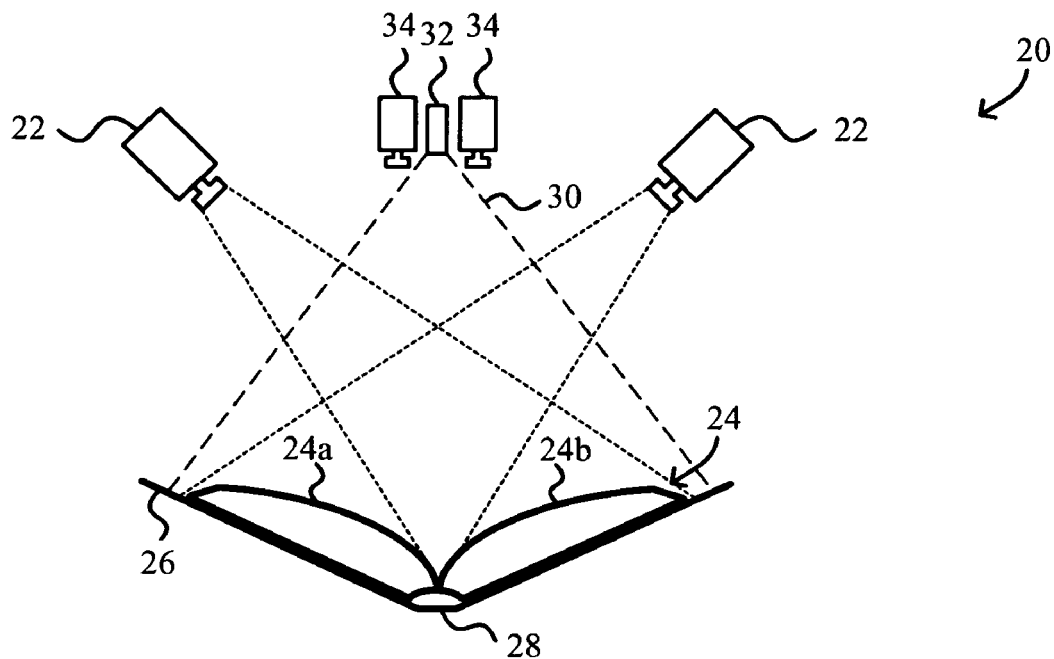
FIG. 1 is a schematic diagram of an exemplary embodiment of an image capturing system utilizing an infrared pattern for three-dimensional model construction.
Figure 2:
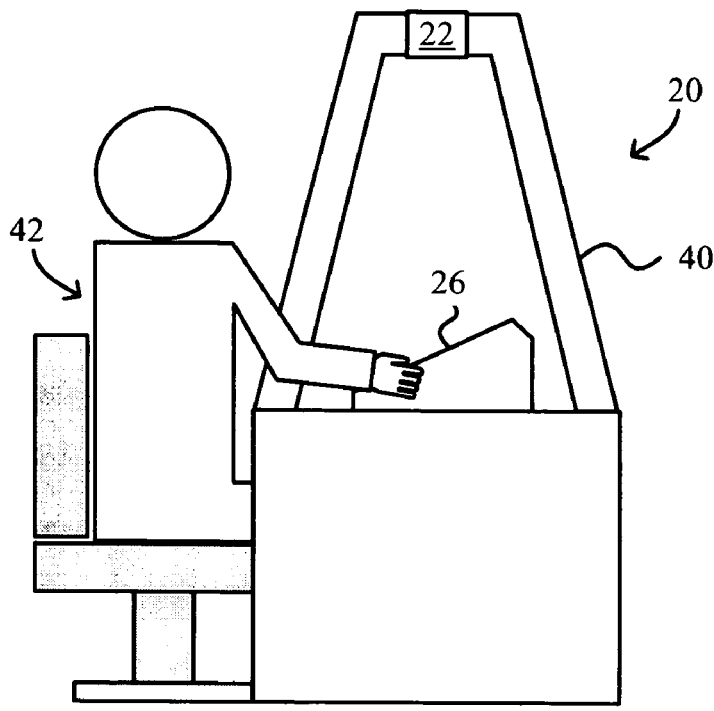
FIG. 2 is a side view illustrating an operator at the image capturing system of FIG. 1.

FIG. 1 is a schematic diagram of an exemplary embodiment of an image capturing system 20 utilizing an infrared pattern for three-dimensional model construction. FIG. 2 is a side view illustrating an operator 42 at the image capturing system 20 of FIG. 1. The image capturing system 20 generally includes one or more cameras 22, such as two high resolution cameras each for imaging or photographing a corresponding facing page 24a, 24b of an open bound document, such as a book 24, resting in a support, such as an angled cradle 26, a table top, or a mechanical device specially adapted for holding books and other documents. The cradle 26 may provide a generally flat gutter 28 such that the spacing between the left and right sides of the cradle 26 may be adjustable. The cradle spacing can be adjusted so as to maintain the distances of the pages to the camera relatively the same for books of different thicknesses in order to maintain camera focus. It is to be understood that although a book is used herein in describing the imaging system and process, the system and process may be utilized to and/or adapted for use in the imaging of any other suitable type of bound documents such as periodicals, manuscripts, pamphlets, brochures, newspapers, manuals and/or any other types of documents having a bound edge, typically with a hard or soft cover. The system and process may also be utilized and/or adapted for use in the imaging of unbound documents or various other applications in which construction of a three-dimensional model is desired. Furthermore, although the cameras 22 are shown as an exemplary image capturing mechanism for the image capturing system 20, any other image capturing mechanism such as a camera in combination with moving mirrors may be employed. The system 20 may include a housing 40 or other structure to house or otherwise support the cameras 22, lighting mechanism, and/or other components of the image capturing system 20. The cameras 22 facilitate in converting the facing pages 24a, 24b into electronic form for processing using, e.g., optical character recognition (OCR) techniques to produce an editable and/or searchable version of the document's text. The two sides of the cradle 26 corresponding to each facing page 24a, 24b, respectively, may form a cradle angle of approximately 130° for better ergonomics and book curvature.

Typically, the facing pages 24a, 24b of the open, edge-bound book 24 are inherently curved or otherwise warped, particularly in the absence of flattening pressure that can potentially damage the book 24 and/or slow the rate of the image capturing process. The curved surfaces of the facing pages 24a, 24b cause distortion in the captured images which is generally most noticeable in the vicinity of the binding. Without compensating for the image distortion, the image quality and/or OCR accuracy can decrease.

One method for compensating for the image distortion is to perform image processing on the captured images using a three-dimensional model of the curved pages. In particular, a pair of stereoscopic cameras 34 can be employed to capture three-dimensional shape information of the curved pages with which to build the three-dimensional model of the curved pages. The three-dimensional model can then be used to approximately rectify or de-warp the images captured by the cameras 22. The stereoscopic cameras 34 may employ, for example, a band pass filter on conventional cameras that also work in the visible light to image infrared (IR) images projected onto the facing pages 24a, 24b by one or more infrared projectors 32. One example of a band pass filter may be a narrow infrared band pass filter with a band centered around a wavelength of approximately 830 nm.

The three-dimensional shape (or quasi-three-dimensional) spatial data or shape information captured by the stereoscopic cameras 34 is subjected to signal processing to construct three-dimensional models of the curved pages 24a, 24b. As noted above, the three-dimensional models of the curved pages 24a, 24b are then used to un-distort or de-warp the images of the pages 24a, 24b captured by the cameras 22.

A higher quality three-dimensional model increases the quality of the resulting processed images of the pages 24a, 24b and the accuracy of any OCR performed on the processed images. To improve the quality of the three-dimensional model, an unstructured infrared pattern 38 such as one shown in FIG. 3 may be projected by the infrared projector 32 onto the facing pages 24a, 24b. Although not shown, two the infrared projectors 32 may alternatively be provided to project separate infrared patterns 38 onto each facing page 24a, 24b.

An unstructured pattern generally refers to the pattern being unspecified to the signal processor, i.e., dimensions and relative positions of the features of the pattern being unspecified. Thus the use of an unstructured infrared pattern allows changes to the infrared pattern used for three-dimensional model reconstruction without changes to the signal processing software. The infrared pattern can be feature-rich where features generally refer to corners, shapes, lines, etc. in various sizes and positions, for example. The characteristics of the features, e.g., line thickness, can be adjusted to the characteristics of the stereoscopic cameras and the particular configuration being utilized, e.g., depth of field, camera resolution, distance between the target object and the cameras, etc. The characteristics of the features can also be adjusted to the characteristics of the signal processing software such as its cross-correlation/disparity-matching window. The pattern can have a high entropy, i.e., highly random and unstructured position of the features and/or have random features. The unstructured feature-rich infrared pattern 38 thus provides a higher quality feature detection by the signal processing and hence higher quality three-dimensional model construction.

Figure 3:
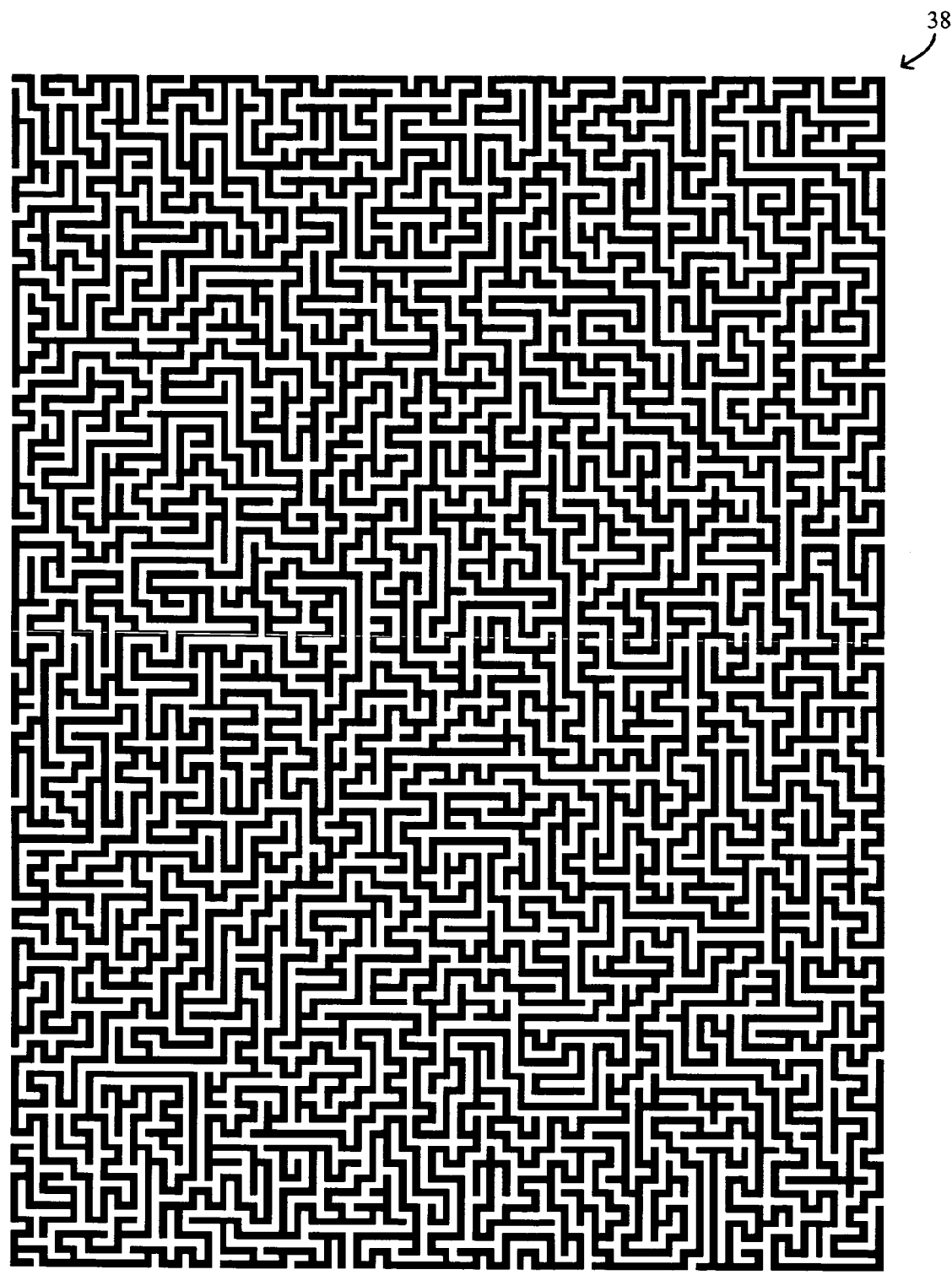
FIG. 3 is one example of a suitable unstructured infrared pattern for three-dimensional model construction.

The infrared pattern 38 can also be a pattern rich in locally unique features, i.e., features without local similarities, and optionally with sharp corners, such as the pattern resembling a labyrinth or a maze as shown in FIG. 3. With the use of the feature-rich infrared pattern 38, the number of points that the signal processor can match in the two stereoscopic images increases, by approximately a factor of ten in one example, resulting in an increase in the quality of the three-dimensional model.

Figure 4:
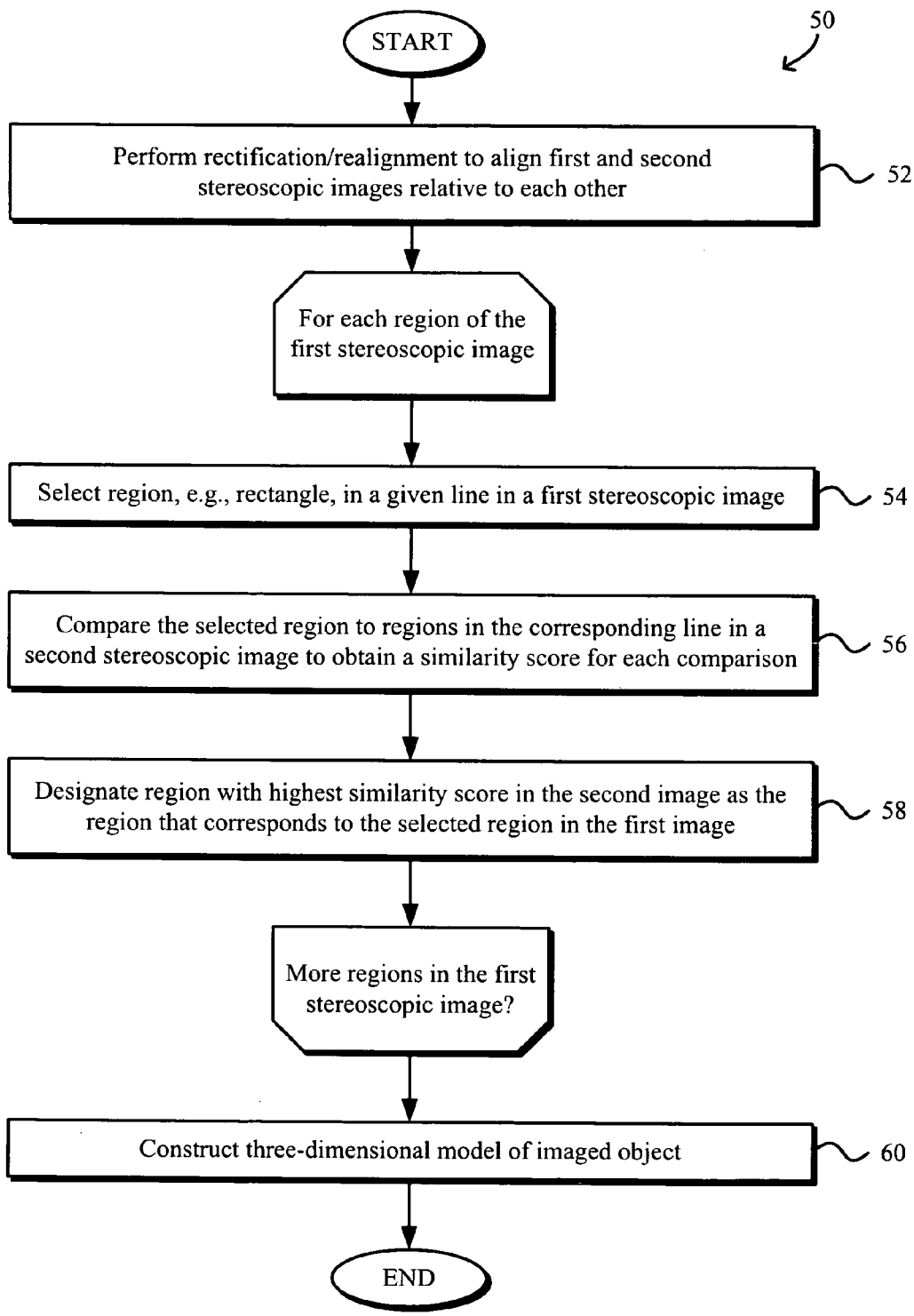
FIG. 4 is a flowchart of an exemplary process for constructing a three-dimensional model of the warped pages utilizing an unstructured infrared pattern.

FIG. 4 is a flowchart of an exemplary signal processing process 50 for constructing a three-dimensional model of the target object being imaged, e.g., the warped pages, utilizing the structured infrared pattern projected onto the object. The process 50 performs signal processing on a line by line basis on the two stereoscopic images of the pattern as captured by the pair of stereoscopic cameras. In particular, a first stereoscopic image may be divided into generally non-overlapping regions with multiple regions forming each line. In other words, the height of each line is generally the same as that of the regions. Each line extends horizontally or in an x-direction, such as across the width of the object or, alternatively, down the length of object, e.g., the facing pages of a book or other document. For each region of the first stereoscopic image, a corresponding matching region is identified in the second stereoscopic image.

In particular, at block 52, rectification is performed to align the first and second stereoscopic images relative to each other so that each line in the second image corresponds to a line in the first image. Various suitable rectification algorithms, as are well known in the art, may be employed in at block 52.

At block 54, a region in a given line is selected in the first stereoscopic image. The region is typically a rectangle that has a height equal to the height of each line and a width greater than the height. The region may be selected based on a predetermined starting point, for example, such as a top left corner.

At block 56, the selected region in the first image is compared to regions in the corresponding line in the second stereoscopic image captured by the second stereoscopic camera. In particular, the selected region can be compared to regions at various positions along the corresponding line in the second image. The regions in the second image to be compared are generally overlapping and may be limited to those within a predetermined distance from the area corresponding to the selected region in the second image. Merely as an example, the predetermined distance may be the width of a region. The comparison is made by performing cross correlations on the selected region in the first stereoscopic image and each region being compared in the second stereoscopic image. Each comparison generates a similarity score. At block 58, the region in the second image corresponding to the highest similarity score as determined in block 56 is determined to be the region in the second stereoscopic image that corresponds to the selected region in the first stereoscopic image. Note that by performing such cross-correlation, the process 50 does not require knowledge of the pattern that is projected onto the target object.

At block 60, a three-dimensional model of target object is constructed using the image data in the first and second stereoscopic images and the matching or corresponding regions in the stereoscopic images as identified in block 58. In one embodiment, blocks 54-58 are repeated for all regions in the first stereoscopic image prior to constructing the three-dimensional model at block 60. In an alternative embodiment, a portion of the three-dimensional model of target object may be constructed after each iteration of blocks 54-60.

The size of the region may be based on the level of granularity of the three-dimensional model desired. In addition, the various lines or features in the infrared pattern projected onto the target object may be sized or otherwise tuned to the size of the region used in the signal processing process 50. The infrared pattern may include a maximum number of features in each region so as to achieve a better three-dimensional model. However, the vertical lines or features of the infrared pattern may have a minimum thickness depending on the infrared cameras and the distance of the cameras to the target object. In particular, the vertical lines should have sufficient thickness to ensure that each vertical line can be captured by the cameras and thus recognizable by the signal processing process. Further, the spacing between adjacent vertical lines should be as narrow as possible so as to increase the number of features in a given region. Because each region as defined by the signal processing is generally much wider than it is tall, the horizontal dimensions are not as significant. Nonetheless, the thickness of each horizontal feature may be less than the height of each region so that the horizontal feature can be identified in signal processing. As noted above, the infrared pattern may be rich in locally unique features, i.e., features without local similarities, each feature having sharp corners. For example, each feature in the infrared pattern may be locally unique in that the feature is not repeated within an area that the signal processing process performs the comparison in block 56.

As is evident, an infrared pattern projected onto a target object, such as facing pages of an open book or other document, is utilized to construct a three-dimensional model of the target object. Using a pair of stereoscopic images captured by stereoscopic cameras and by performing cross-correlation, the signal processing process can rely only on the captured infrared stereoscopic images without attempting to identify patterns or other features in the target object itself, e.g., page edge, etc. Such use of a projected infrared image allows for control of the feature size, shape and pattern and thus helps to maximize the number of features recognized in the signal processing yet allowing for fast construction of the three-dimensional model. The resulting improved three-dimensional model in turn helps in rectifying or de-warping images of the objects.

The three-dimensional model may be constructed for each and every page of the document being imaged. The three-dimensional model can help to greatly increase the precision of de-warping techniques by projecting an unstructured pattern in infrared light.

It is noted that the pattern may also be projected onto the target object in visible light to construct the three-dimensional model of the target object, i.e., physical shape of the target object. However, projecting the pattern in infrared light prevents interference with and thus allows the simultaneous image capturing of the texture of the target object by other cameras capturing in visible light. In particular, the texture of the target object is generally defined herein as the image on the surface of the target object. In the case of a page in a document, the three-dimensional model of the page refers to the shape of the page, e.g., rectangular curved shape, and the texture on the surface of the page refers to the text and/or images on the page. Merely as example, a three-dimensional model of a person constructed using a pattern projected in visible light would include information on the shape of the person, e.g., height, shape characteristics of the face, arms, etc. but would not include eye color, skin color, pattern and/or color of the clothing, etc.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method, comprising:
   projecting an unstructured pattern onto a target object using a projector, wherein the target object is a pair of pages of a multi-page document;
   capturing a pair of stereoscopic images of the unstructured pattern projected onto the target object, wherein one or more stereoscopic cameras capture the pair of stereoscopic images;
   generating respective lines in each of the stereoscopic images;
   vertically rectifying the pair of stereoscopic images relative to each other to align the respective lines;
   performing signal processing on the pair of stereoscopic images to horizontally cross-correlate portions of the pair of stereoscopic images in order to identify corresponding portions in the pair of stereoscopic images, wherein the signal processing is performed utilizing the image data from the stereoscopic images without specification of the pattern;
   capturing a pair of readable images each conveying the content of one of the pair of pages, wherein one or more cameras that are different from the one or more stereoscopic cameras capture the pair of readable images; and
   compensating for distortion in the pair of readable images by transforming the pair of readable images with an output of the signal processing,
   wherein performing signal processing includes dividing a first of the two stereoscopic images into regions, a plurality of regions forming each line, each region having a width that is greater than its height and wherein the performing signal processing is performed for each region of the first stereoscopic image.

2. The method of claim 1, wherein the projecting is performed by an infrared projector to project the unstructured pattern in infrared light onto the target object.

3. The method of claim 1, further comprising:
   constructing a three-dimensional model of the target object.

4. The method of claim 3, further comprising rectifying a digital image of the target object utilizing the three-dimensional model of the target object.

5. The method of claim 1, wherein the unstructured pattern includes at least one feature in each region, the feature being locally unique along at least a portion of the line on which the region is located.

6. The method of claim 1, wherein the unstructured pattern includes at least one feature in each region, at least a portion of which extends along the height of the region.

7. The method of claim 1, wherein the performing signal processing further includes:
   comparing each region in the first stereoscopic image to areas at a plurality of positions along a corresponding line in a second of the two stereoscopic images, each area being of generally a same size as each region, each comparison generates a similarity score between the region in the first stereoscopic image and the area in the second stereoscopic image; and
   designating the area in the second stereoscopic image with the highest similarity score as the area that matches the region in the first stereoscopic image.

8. The method of claim 7, wherein the comparing is performed on areas in the second stereoscopic image within a predetermined distance from an area corresponding to the region being compared in the first stereoscopic image.

9. The method of claim 1, wherein an epipolar line of the pair of stereoscopic cameras is generally perpendicular to a spine of the bound document.

10. The method of claim 1, wherein the one or more cameras comprise two cameras, and wherein the pair of stereoscopic cameras are located between the two cameras.

11. The method of claim 1, comprising forming a text document from transformed pair of readable images by optically recognizing characters in the transformed pair of readable images.

12. A computer readable storage medium embedded with a computer program product, the computer program product including instructions that, when executed by a processor, cause the processor to perform actions comprising:
   receiving a pair of stereoscopic images of an unstructured pattern projected onto a target object, wherein the pair of stereoscopic images are captured from a first pair of perspectives, respectively, and wherein the target object is a curved surface of a document;
   generating respective lines in each of the stereoscopic images;
   vertically rectifying the pair of stereoscopic images relative to each other to align the respective lines;
   performing signal processing on the pair of stereoscopic images to horizontally cross-correlate portions of the pair of stereoscopic images in order to identify corresponding portions in the pair of stereoscopic images, wherein the signal processing is performed utilizing the image data from the stereoscopic images without specification of the unstructured pattern;
   receiving an image of the curved surface of the document from a third perspective that is different from either of the first pair of perspectives, wherein the image of the curved surface of the document conveys the content of the document; and transforming the image of the curved surface of the document into an image of the document at it would appear were it not curved based on a result of the signal processing, wherein performing signal processing includes dividing a first of the two stereoscopic images into regions, a plurality of regions forming each line, each region having a width that is greater than its height and wherein the performing signal processing is performed for each region of the first stereoscopic image.

13. The computer readable storage medium of claim 12, wherein the pair of stereoscopic images are of the unstructured pattern projected onto a target object in infrared light.

14. The computer readable storage medium of claim 12, further including instructions that, when executed by a processor, cause the processor to perform actions comprising:
constructing a three-dimensional model of the target object.

15. The computer readable storage medium of claim 14, further including instructions that, when executed by a processor, cause the processor to perform actions comprising:
rectifying a digital image of the target object utilizing the three-dimensional model of the target object.

16. The computer readable storage medium of claim 12, in which the unstructured pattern includes at least one feature in each region, the feature being locally unique along at least a portion of the line on which the region is located.

17. The computer readable storage medium of claim 12, in which the unstructured pattern includes at least one feature in each region, at least a portion of which extends along the height of the region.

18. The computer readable storage medium of claim 12, in which the performing signal processing further includes:
comparing each region in the first stereoscopic image to areas at a plurality of positions along a corresponding line in a second of the two stereoscopic images, each area being of generally a same size as each region, each comparison generates a similarity score between the region in the first stereoscopic image and the area in the second stereoscopic image; and
designating the area in the second stereoscopic image with the highest similarity score as the area that matches the region in the first stereoscopic image.

19. The computer readable storage medium of claim 18, in which the comparing is performed on areas in the second stereoscopic image within a predetermined distance from an area corresponding to the region being compared in the first stereoscopic image.

20. A system, comprising:
an infrared projector configured to project an infrared pattern onto a target object, wherein the target object is a multi-page document;
a support configured to position the target object in front of the infrared projector;
a pair of stereoscopic infrared cameras configured to capture stereoscopic images of the infrared pattern projected onto the target object;
a signal processor configured to vertically rectify a pair of stereoscopic images relative to each other to align respective lines of the stereoscopic images, and further configured to perform signal processing on the pair of stereoscopic images to horizontally cross-correlate portions of the pair of stereoscopic images in order to identify corresponding portions in the pair of stereoscopic images and to construct a three-dimensional model of the target object; and
another camera configured to capture an image of the semantic content of a page of the target object, wherein the signal processor is further configured to transform the image of the semantic content of the page based on the three-dimensional models
wherein the signal processor is further configured to divide a first of the two stereoscopic images into regions, a plurality of regions forming each line, each region having a width that is greater than its height, the signal processor is further configured to perform the signal processing for each region of the first stereoscopic image.

21. The system of claim 20, wherein the infrared pattern includes at least one feature in each region, the feature being locally unique along at least a portion of the line on which the region is located.

22. The system of claim 21, wherein the infrared pattern includes at least one feature in each region, at least a portion of which extends along the height of the region.

23. The system of claim 21, wherein the signal processing performed by the signal processor includes:
comparing each region in the first stereoscopic image to areas at a plurality of positions along a corresponding line in a second of the two stereoscopic images, each area being of generally a same size as each region, each comparison generates a similarity score between the region in the first stereoscopic image and the area in the second stereoscopic image; and
designating the area in the second stereoscopic image with the highest similarity score as the area that matches the region in the first stereoscopic image; and
constructing the three-dimensional model of a target object based on the image data of the pairs of matching region and area.

24. The system of claim 21, wherein the signal processor performs the comparing on areas in the second stereoscopic image within a predetermined distance from an area corresponding to the region being compared in the first stereoscopic image.

25. The system of claim 20, wherein the pair of stereoscopic infrared cameras comprise an optical band-pass filter configured to pass infrared light while obstructing at least part of the visible spectrum.

* * * * *

UNITED STATES PATENT AND TRADEMARK OFFICE
CERTIFICATE OF CORRECTION

PATENT NO. : 7,660,458 B1
APPLICATION NO. : 11/011727
DATED : February 9, 2010
INVENTOR(S) : Marin Saric It is certified that error appears in the above-identified patent and that said Letters Patent is hereby corrected as shown below:

In claim 20, column 10, line 17, delete "models" and insert --model,--.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,458 B1 | Page 1 of 1 |
| APPLICATION NO. | : 11/011727 | |
| DATED | : February 9, 2010 | |
| INVENTOR(S) | : Marin Saric | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 982 days.

Signed and Sealed this

Thirtieth Day of November, 2010

David J. Kappos
*Director of the United States Patent and Trademark Office*